March 13, 1962
P. A. BELKNAP ET AL
3,025,403
SEAMLESS ARTICLE
Filed Feb. 11, 1959
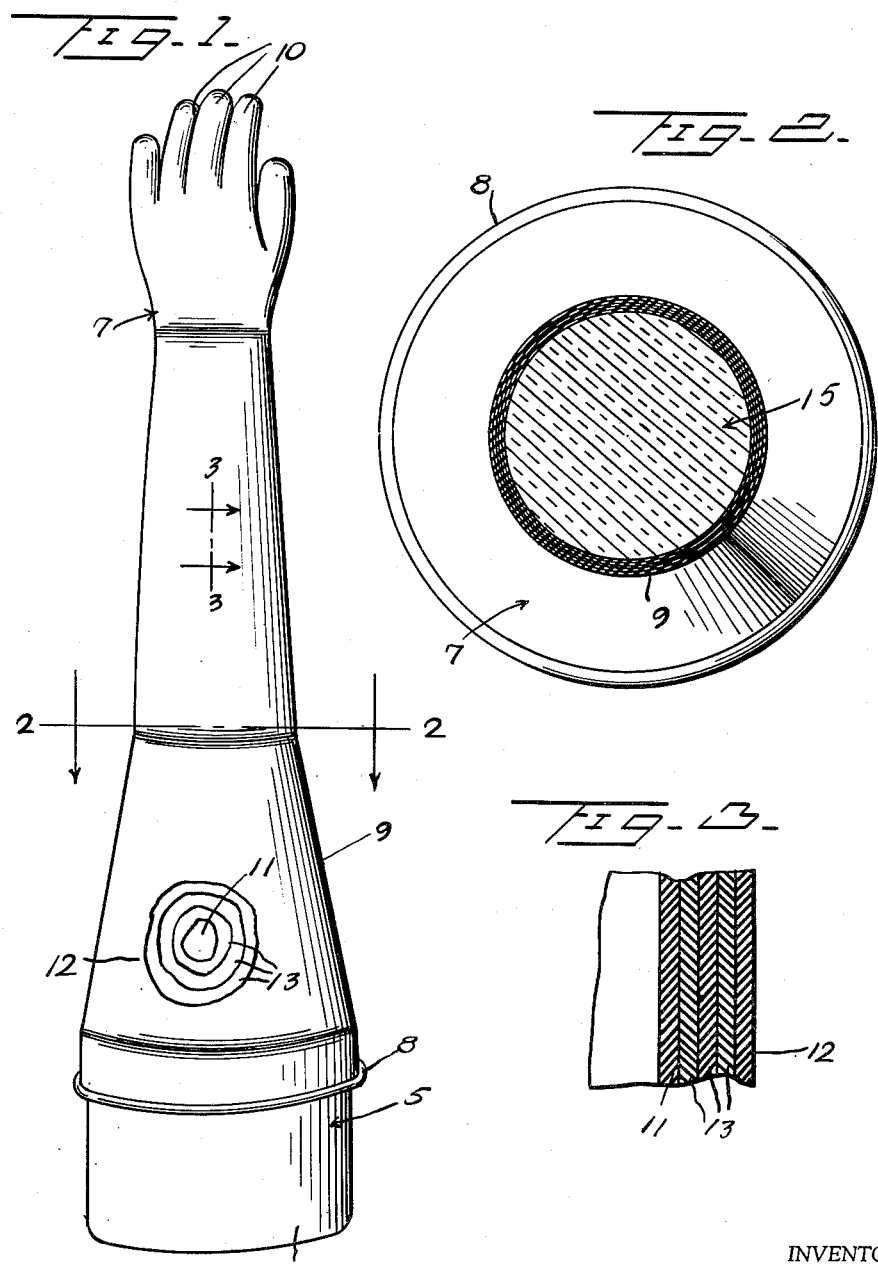
INVENTORS
J.J. KEILEN, JR.,
P.A. BELKNAP
BY John N. Randolph
ATTORNEY

3,025,403
SEAMLESS ARTICLE
Paul A. Belknap, North Charleston, and John J. Keilen, Jr., Charleston, S.C., assignors to Charleston Rubber Company, Charleston, S.C., a corporation of Ohio
Filed Feb. 11, 1959, Ser. No. 792,540
6 Claims. (Cl. 250—108)

This invention relates to a seamless article of novel construction and to a novel fabrication method making possible the production of such article.

While the article will be hereinafter described as a glove, it will be readily apparent that the novel method may be employed for producing various other articles.

A primary object of the present invention is to provide a seamless dipped glove having therein a lead containing compound and which is produced by dipping a form into a solution containing an elastomer which may be either natural rubber or synthetic rubber, for building up by a film deposit method of fabrication a plurality of merging or integrated thin films of great strength, smoothness and lower permeability, to thereby produce a glove (or other article) which is seamless and sufficiently flexible to provide excellent digital dexterity.

A further object of the invention is to produce such a glove which is lead loaded to protect the wearer from the harmful effects of radiation from radioactive materials. The elastomeric substance used may be any one that will provide the desired properties, such as strength and flexibility, and resistance to oil, chemicals, ozone, oxygen, and abrasion. For general purposes certain types of neoprene provide the best balance of such properties and give articles of extended service; yet in cases of resistance to certain solvents, resistance to permeation by vapors or gases, or for other special purposes, natural rubber or one of the other synthetic elastomers will be more serviceable.

The production of such an article by a dipping process to produce a seamless article of substantially uniform thickness provides an article which is far superior to gloves, for example, produced for the same purpose and which are assembled by cutting and sewing or cementing. Such gloves are weak at the seams and subject to tearing, and the seams constitute possible points of penetration of radiation from radioactive materials. Furthermore, such gloves, as have been produced in the past and which include a layer of lead or lead compound filled rubber sheets, are extremely heavy, bulky and lacking in flexibility.

The formulation of a solution or mix which may be used for producing the article by a dipping process presents a difficult problem. In order to achieve the desired radiation protection in a practical weight and thickness, the lead compound used is one of high lead content, preferably lead or lead oxide. Yet these substances are known to be vulcanizing agents and accelerator-activators for neoprene and other elastomers, functioning in much the same way as zinc oxide and magnesium oxide in conventional formulas. One feature of securing stable lead compound containing mixes for the dipping process is elimination of the usual zinc and magnesium oxides from the formula. With some types of neoprene, gelation is still encountered, so a further feature of our invention is use of the slow-curing or nonsulfur-modified types. Finally we use as curing agents such substances as tetramethylthiuram monosulfide which are known to retard the vulcanization at room or dipping temperature, but which accelerate it at the elevated curing temperature such as 300° F. or above.

Accordingly the present invention includes the discovery that certain types of neoprene, specifically those not including zinc oxide or magnesium oxide, can be utilized in the practice of the method. Instead of the zinc oxide and magnesium oxide, the neoprene is compounded with a slow vulcanizing agent, such as sulphur, not normally used with neoprene.

One such solution or cement which is especially adapted for producing a lead loaded article (glove) by the film deposit method may be composed of the following:

| | Parts by weight |
|---|---|
| Neoprene | 100 |
| 2,2'-methylene-bis (4-methyl 6-tertiary butylphenol) | 2 |
| Stearic acid | 0.5 |
| Red lead oxide (98%) | 500 |
| Sulphur | 1 |
| Tetramethylthiuram monosulfide | 1 |

This stock is placed in a sufficient quantity of equal parts of a mixture of toluene and xylene to dissolve the soluble constituents and to suspend the insoluble ones, and to provide a viscosity of 1250–1300 cp. It has been found that this solution or cement will remain stable for as long as six months.

Another such solution constituting a butadiene-acrylonitrile elastomer may be composed of the following:

| | Parts by weight |
|---|---|
| Nitrile rubber (high acrylonitrile content) | 100 |
| Zinc oxide | 3 |
| Phenyl-alpha-naphthylamine | 1 |
| Sulfur | 1.5 |
| 4,4'-dithiomorpholine | 1 |
| Red lead oxide (98%) | 500 |
| Benyothiazyl disulfide | 1.0 |
| Tetramethylthiuram disulfide | 0.5 |

The nitrile rubber was broken down on a two roll laboratory mill, and the other compounding ingredients added on the mill also. The stock was placed in a dissolver with 650 parts of monochlorobenzene, which gave a cement of 1100 cp. viscosity. Films prepared from the cement had excellent oil resistance, as well as being capable of supplying protection against radiation.

Films have also been successfully prepared from other mixtures, for example, a mixture consisting of 100 parts of brominated butyl rubber, 1000 parts of lead powder, and 550 parts of toluene.

Various other objects and advantages of the invention will hereinafter become more fully apparent from the following description of the drawing, illustrating a preferred embodiment of the invention, and wherein:

FIGURE 1 is an elevational view, partly broken away, showing a glove produced by the method and a mold core or form on which the glove is fabricated;

FIGURE 2 is an enlarged cross sectional view thereof, taken substantially along a plane as indicated by the line 2—2 of FIGURE 1, and FIGURE 3 is a fragmentary view on a substantially enlarged scale, taken substantially along a plane as indicated by the line 3—3 of FIGURE 1.

Referring more specifically to the method and the article produced thereby, the mold core or form 5, which is preferably formed of porcelain, is held by its base end 6, in any suitable manner, and is dipped into a vat, not shown, containing a solution or cement, previously described, for depositing thereon a film coating. The form or core 5 is of course inverted from its position of FIGURE 1 for dipping. The core or form may be dipped any desired number of times to produce the article (glove) 7 of a desired thickness. Two hours are allowed for setting and drying after each dipping of the core or form. After the last dipping, the article 7 is further dried while being subjected to a temperature of approximately 175° F., after which the article 7 is cured on the form 5 for forty-five minutes at a temperature of 305° F.

Prior to the final heat drying and curing, as previously described, and which is preferably accomplished in a temperature controlled oven, not shown, the end of the glove 7 located adjacent the base end 6 of the form 5 is rolled to form a bead 8 of the glove cuff 9.

In order to produce a glove or other article of substantially uniform thickness from end-to-end thereof, the drying of the successive films is preferably accomplished with the form or core disposed alternately in an upright position, as illustrated in FIGURE 1, and in an inverted position, so that the solution will alternately drain away from and toward the fingers 10 of the glove 7, respectively.

In the normal practice of the aforedescribed method, the base end 6 of a plurality of the forms 5 will be secured to a rack which is lowered and raised for simultaneously dipping the form into and out of the solution or cement. Such rack can also be inverted for supporting the forms either depending from or rising from the rack during the drying period of each deposited film.

While the article or glove 7 can be made in the aforedescribed manner from a plurality of films of the same solution or cement, the invention also includes fabricating gloves or other articles by the film deposit method by employing two or more types of solutions or cements. For the purpose of illustration, FIGURE 3 of the drawing shows the glove 7 composed of five films including an innermost film 11, an outermost film 12 and three intermediate films 13; however, ordinarily the films will merge so that no division will actually exist between the various films, or the films may be integrated. It will be understood that the thickness of the glove has been substantially exaggerated in FIGURE 2 and greatly exaggerated in FIGURE 3 for the purpose of clarity. Furthermore, ordinarily the glove or article 7 will be composed of twelve or more thin films. Since the lead loaded films produced from dipping the form into the aforedescribed solution or cement has less strength than films produced from many other types of conventional neoprene or elastomer solutions, and because injuries can result to the skin by direct contact with the lead loaded film, in some instances it is desirable to provide an inner and outer film on the article or glove 7 formed of a cement not containing the lead filling. Thus, the initial or inner film 11 may be formed by dipping the core 5 into a conventional solution to provide an inner film lining to protect the skin of the wearer, and the last or outermost film 12 may also be formed of the conventional non-lead loaded film. These inner and outer films 11 and 12, respectively, in addition to being of greater strength, have greater smoothness than the intermediate lead loaded films 13 and lower permeability. Thus, both the inner and outer surfaces of the finished article or glove 7 can be readily washed for removing contaminating materials therefrom. However, it is to be understood that the invention is not limited to a glove or article 7 having the non-lead loaded innermost and outermost film layers.

Gloves 7 produced by the aforedescribed method may be made in substantially any length up to and exceeding thirty-two inches and are thus well adapted to provide "dry box gloves," that is, a glove the cuff of which is fastened by a special ring to support the glove in an airtight box or cabinet for affording protection to the hand of the operator from radioactive materials while performing operations with the hand within such cabinet.

Various other modifications and changes are likewise contemplated and may be resorted to, without departing from the function or scope of the invention as hereinafter defined by the appended claims.

We claim as our invention:

1. A seamless irregularly shaped article, such as a glove, composed of a plurality of closely adhering superimposed films of elastomer solutions, at least one of said films comprising a homogeneously lead integrated elastomer forming a barrier against the passage of radiation of radioactive materials through the article and which film possesses a high degree of elasticity and flexibility.

2. A seamless article as defined by claim 1, wherein the lead constitutes lead oxide.

3. A seamless article as defined by claim 1, wherein the lead comprises powdered metallic lead.

4. A seamless article as defined by claim 1, wherein the elastomer of said film is natural rubber.

5. A seamless article as defined by claim 1, wherein the elastomer of said film is neoprene, a polychlorobutadiene elastomer.

6. A seamless article as defined by claim 1, wherein the elastomer of said film is a copolymer of butadiene and acrylonitrile.

References Cited in the file of this patent

UNITED STATES PATENTS

| | | |
|---|---|---|
| 1,580,857 | Richards | Apr. 13, 1926 |
| 1,988,709 | Barns | Jan. 22, 1935 |
| 2,326,160 | Neiley et al. | Aug. 10, 1943 |
| 2,328,105 | Strobino | Aug. 31, 1943 |
| 2,373,940 | Beall | Apr. 17, 1945 |
| 2,404,225 | Green | July 16, 1946 |
| 2,528,235 | Loritsch | Oct. 31, 1950 |
| 2,683,263 | Lenhart | July 13, 1954 |
| 2,788,291 | Stertz | Apr. 9, 1957 |
| 2,796,411 | Zirkle et al. | June 18, 1957 |
| 2,845,660 | Peiler | Aug. 5, 1958 |

FOREIGN PATENTS

| | | |
|---|---|---|
| 27,357 | Great Britain | Oct. 12, 1905 |
| 703,153 | Great Britain | Jan. 27, 1954 |